M. JOHNSON.
Cultivator.

No. 209,401. Patented Oct. 29, 1878.

Attest:
H. L. Perrine
C. F. Murray

Inventor.
Moses Johnson
By Myers & Co.
Attys

UNITED STATES PATENT OFFICE.

MOSES JOHNSON, OF LOCKPORT, NEW YORK, ASSIGNOR OF ONE-HALF HIS RIGHT TO MOSES CRANDALL RICHARDSON, OF SAME PLACE.

IMPROVEMENT IN CULTIVATORS.

Specification forming part of Letters Patent No. 209,401, dated October 29, 1878; application filed July 19, 1878.

*To all whom it may concern:*

Be it known that I, MOSES JOHNSON, of Lockport, in the county of Niagara and State of New York, have invented certain new and useful Improvements in Cultivators; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
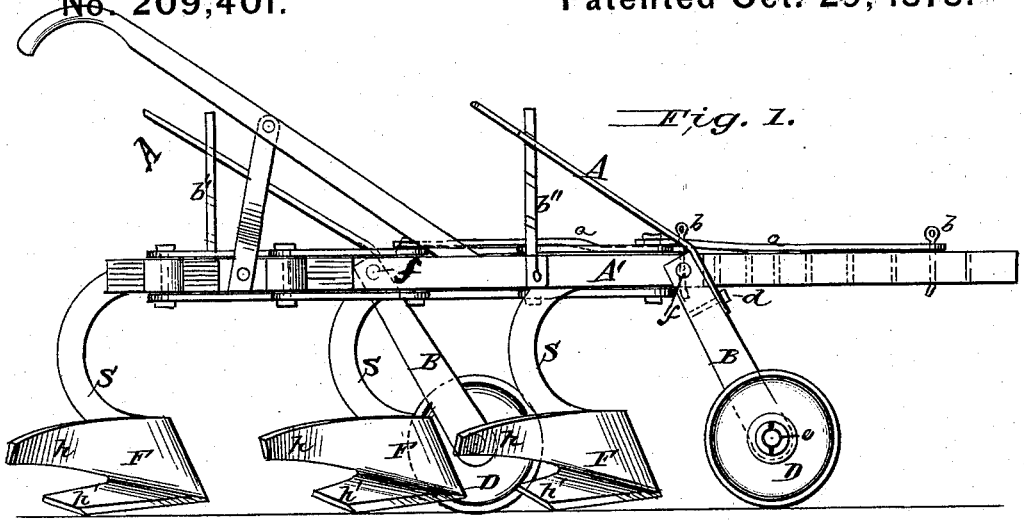
Figures 2, 3:
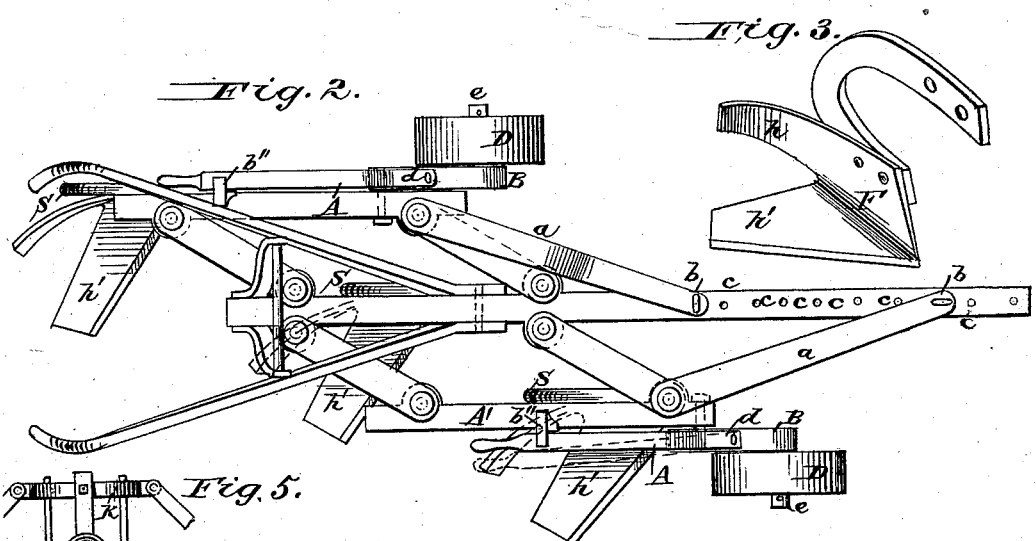
Figures 4, 5:
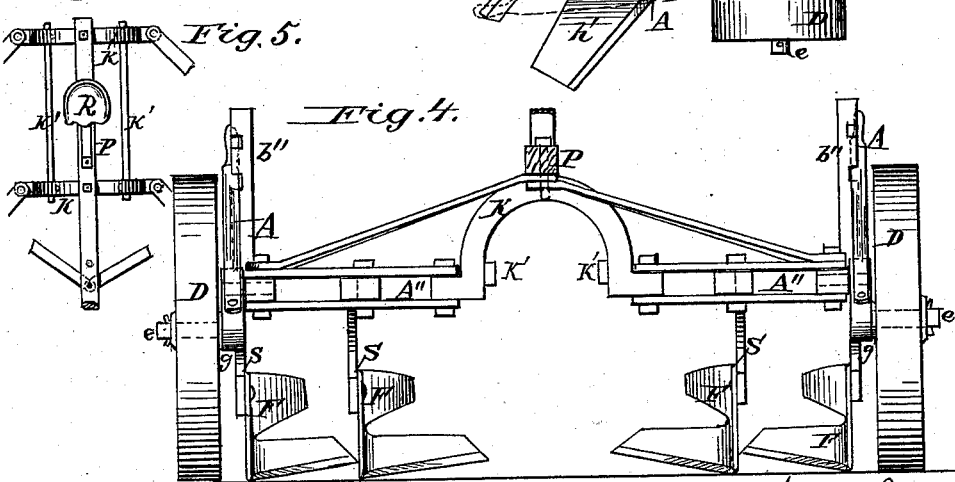

In the accompanying drawings, forming a part of my specification, Figure 1 is a side view of my improved cultivator. Fig. 2 is a plan view of the same. Fig. 3 represents one of the teeth or shovels detached. Fig. 4 shows in cross-section, and Fig. 5 in plan, a modification of my improvement for animal-draft, which is designed chiefly for the cultivation of corn.

My improvement consists in the construction of the teeth of the cultivator, each of which is formed of a single piece of sheet metal, bent nearly at right angles, so as to form a vertical or land-side section and a horizontal share-section, the land-side section being inclined inwardly from point to top, and having a rear inwardly-curved extension, and the share-section provided with a cutting-edge running backward obliquely from the point.

In constructing my cultivator I provide adjustable wings, either or both of which may be spread open or contracted to equal or unequal distances from the main beam. One wing may be projected forward and one rearward in the manner of a gang-plow, or projected forward and rearward from or toward the main or central beam of the cultivator in a position parallel to the beam, and to these wings the standards of the plows or cultivator-teeth are fastened, the number of which may be varied to suit the work to be performed.

The wings are adjustable by means of the braces $a\ a$ and the bolts $b\ b$, without relation to each other, separately or simultaneously. These braces are each pivoted or linked at one end to one of the side wings, and their other ends are secured in any of the vertical orifices $c\ c$ by the bolts $b\ b$, as shown in Fig. 2.

A A represent levers, which are pivoted by the bolts $d\ d$ to the standards or wheel-supports B B. The standards have each a right-angular bar, $e$, forming an axis or axle-tree for reception of their respective wheels D D.

The standards B B are pivoted by the bolts $f f$ to the frames A', and hence, when the levers A A are depressed, the wheels are lifted on the fulcrums or bolts $f f$. The wheels are adjusted by inserting the levers A A in the horizontal spaces between the teeth of the vertical racks $b''\ b''$, which latter are rigidly secured to their respective beams.

The washers $g\ g$, Fig. 4, are designed to make room for the horizontal movement of the levers A A.

F marks my improvement in cultivator-teeth, as shown in Fig. 3. It consists of the parts $h$ and $h'$. The lower part, in connection with the upper section, is so shaped at the front end thereof (the sections being slightly bent toward each other, or nearly at right angles) as to present to the soil in practice a suitable plow-point.

The cultivator-tooth is preferably made of one piece of sheet metal, and the length of its sections may be varied to suit the character of the work to be performed; hence the upper section $h$ may be formed much longer or shorter horizontally than its corresponding section $h'$. At a point about midway or intermediate as to the length of the tooth the sections are formed by a partial separation of the parts of the tooth, the upper section being shaped to ascend at a slight angle from the point of divergence, and caused to rapidly taper as it approaches its terminal, the tapering being slightly increased by a curve toward the lower part of said upper section of the tooth as it approaches its terminus at the rear. The lower section of the tooth flares obliquely from the point where the divergence of the sections commences, and the whole tooth is fashioned to strike the earth obliquely from front to rear. As the upper section of the tooth is elevated above the point which cuts the weeds, when the weeds are cut by the lower section they are completely turned over, and the soil is scraped and leveled by the projecting wing of the upper section. The upper section, where bolted to the standard, is nearly vertical; but the lower section projects at an angle and obliquely therefrom.

The frames A″, Fig. 4, have hinged or linked to them in front and rear the metallic arches K, which are secured and strengthened by the longitudinal bars K′ K′. The obvious design of these arches is to elevate the central part of the cultivator and driver above the corn. To the apex of the arches K K is bolted the central or main beam P, whereon is provided the seat R. Said beam has also provided therein the vertical orifices $c\ c$, through which the bolts $b\ b$ are projected for securing the braces of the device, as hereinbefore described.

I claim—

The cultivator-tooth F, made of one sheet of metal, bent nearly at right angles, forming a vertical section, $h$, corresponding to the landside of a plow, which inclines rearwardly from the point to the top, and is provided with a rear extension curved inward toward the furrow, and having a horizontal or share section, $h'$, with a cutting-edge running backward obliquely from the point, substantially as shown and described.

In testimony that I claim the foregoing as my own I affix my signature in presence of two witnesses.

MOSES JOHNSON.

Witnesses:
   J. J. ARNOLD,
   P. LEONARD.